3,507,936
BIS-ALKYLENE PYROPHOSPHATE-UREA REACTION AND REACTION PRODUCT
Robert S. Olson and Robert D. Wilcox, Walnut Creek, Calif., assignors to The Dow Chemical Company, Midland, Mich., a corporation of Delaware
No Drawing. Filed Feb. 10, 1967, Ser. No. 615,062
Int. Cl. C07f 9/02; C07d 105/02; B01j 1/16
U.S. Cl. 260—920      10 Claims

ABSTRACT OF THE DISCLOSURE

A bis-alkylene pyrophosphate is condensed at about 170° C. with about 3 molar equivalents of urea to produce a novel glassy solid product containing about 15–20% by weight of each of N and P and having utility as a corrosion inhibitor and as a slow-release fertilizer.

BACKGROUND OF THE INVENTION

A mixture of phosphoric acid and urea has been dehydrated at elevated temperatures to produce a "urea phosphate" which was then used as an intermediate in making phosphate esters (U.S. Patent 3,250,756).

Bis-alkylene pyrophosphates are known (U.S. Patent 3,159,591) but have not heretofore been condensed with urea.

SUMMARY OF THE INVENTION

This invention relates to condensation products of unknown molecular structure, which products are made by condensing about 3 molecular equivalents of urea with a bis-alkylene pyrophosphate at an elevated temperature.

The pyrophosphate has the formula

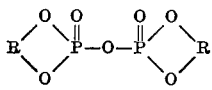

wherein R represents an alkylene radical of 2–8 carbon atoms in which the carbon atoms of attachment to the phosphate group are either vicinal or are separated by a single carbon atom. The alkylene groups may bear inert substituents, such as cycloalkyl or phenyl. Such compounds are known and can be made, for instance, by the method set forth in U.S. Patent 3,159,591.

The preferred pyrophosphates are of vicinal alkylene phosphates wherein each alkylene group contains 2–4 carbon atoms, these being the most reactive and producing products having the highest content of P and N.

Apparently the urea and pyrophosphate react in a molar ratio of about 3:1. Higher or lower ratios will react to some extent but do not produce as homogeneous a product as does the 3:1 ratio.

The reaction is strongly exothermic, hence, the amount of materials involved should be kept small or effective heat removal should be provided. A convenient procedure is to intimately mix the two reactants and then gradually raise the temperature of the mixture until a self-sustaining reaction begins. This is usually at a temperature of 140–200° C., although a slow reaction is sometimes observable at lower temperatures. The reaction is evidenced by a considerable evolution of gas and heat. The product is a solid that can be readily pulverized and is generally water soluble.

Dissipation of the heat of reaction and control over the rate of reaction, especially in large-scale production, is facilitated by conducting the reaction in an inert liquid medium, preferably one having a boiling point at or slightly above the desired reaction temperature. Preferably the liquid should dissolve at least one of the reactants, though this is not essential. Preferred inert liquids include the aliphatic and aromatic hydrocarbons having boiling points of about 140–200° C., such as petroleum distillates, xylenes and higher alkylated benzenes.

DETAILED DESCRIPTION

The practice of the invention is illustrated by the following examples.

EXAMPLE 1

Urea (18 g., 0.3 mole) was mixed with bis-ethylene pyrophosphate (23 g., 0.1 mole). The latter can be prepared by the method of U.S. Patent 3,159,591. According to the nomenclature system used in the patent, this compound would be called 2,2′-dioxo-pyro-1,3,2-dioxaphospholane. The mixture was heated in an open vessel to 170° C., at which point a vigorous exothermic reaction with evolution of gas occurred and the mixture became very viscous and subsequently solidified on cooling. Analysis showed C, 20.2%; H, 4.4%; P, 17.1% and N, 19.6%. The hard, glossy solid was slowly soluble in water, in which it showed an apparent molecular weight of 189.

EXAMPLE 2

Two hundred g. (0.87 m.) of bis-ethylene pyrophosphate and 146 g. (2.43 m.) of urea were mixed and heated in an open vessel. Gas evolution began at about 100° C. A rapid increase in viscosity began at about 160° C. At about 170° a vigorous exothermic reaction began, with evolution of large volumes of gas. The peak exotherm temperature was not observed but was above 240° C. The product, after being cooled, was a porous brittle solid, slowly soluble in water, in which it showed a pH of 3–4. Its elemental analysis was: C, 19.9%; H, 5.0%; P, 18.4% and N, 17.6%.

The product of the above examples was tested as a slow-release fertilizer for lawn grass and corn. It showed no phytotoxic properties and the release rate was about the same as, or slightly lower than, that of a widely used commercial "ureaform" slow-release fertilizer.

The product was also an effective inhibitor of the corrosion of ferrous metals by aqueous acids, particularly that caused by the "sour brines" found in oil fields.

Similar products having the same utilities are obtained by use of other bis-alkylene pyrophosphates in the above process. Suitable ones include those wherein the alkylene group is 1,2- or 1,3-propylene, 1,2-, 2,3- or 1,3-butylene, 1,2-, 2,3-, 1,3-, 2,4- or 3,4-octylene, phenylethylene, 1-phenyl-2,3-butylene, cyclohexylene, and the like. Such higher homologs and analogs will, of course, contain a lower percentage of P and N than do the products of the above examples. Also, they are, in general, less soluble in water and, when used as fertilizers, show slower release of their nutrients.

We claim:

1. The process comprising reacting by contacting at reaction temperature of at least 100° C. a mixture of urea and a bis-alkylene pyrophosphate in a molar ratio of about 3:1.

2. The process of claim 1 wherein each of the alkylene groups of the pyrophosphate has 2–8 carbon atoms.

3. The process of claim 1 where the reaction temperature is about 140–200° C.

4. The process of claim 3 wherein the bis-alkylene pyrophosphate is bis-ethylene pyrophosphate.

5. The process of claim 1 when conducted in an inert liquid medium.

6. The product of the process of claim 1.

7. The product of the process of claim 2.

8. The product of the process of claim 3.

9. The product of the process of claim 4.

10. The product of the process of claim 5.

References Cited

Ueda et al.: "Chemical Abstracts," vol. 60, p. 3098 (1964).

CHARLES B. PARKER, Primary Examiner

A. H. SUTTO, Assistant Examiner

U.S. Cl. X.R.

252—400; 260—933, 938, 968